United States Patent Office 3,819,741
Patented June 25, 1974

3,819,741
PURIFICATION PROCESS FOR A HYDROCARBON CONVERSION EFFLUENT
Robert M. Marsheck and Forrest L. Poska, Bartlesville, Okla., assignors to Phillips Petroleum Company
Filed Sept. 8, 1971, Ser. No. 178,555
Int. Cl. C07c 7/02, 11/16
U.S. Cl. 260—680 E    12 Claims

ABSTRACT OF THE DISCLOSURE

Liquid streams containing impurities are freed of the impurities by contacting the liquid stream with particulate materials for deposition of the impurity onto the particulate material and subsequently subjecting the particulate material having deposited theeron the impurities to an elevated temperature and an oxygen-containing gas to oxidize and burn off the impurities from the particulate solids and converting impurities to innocuous materials which can be discharged to the atmosphere. In one embodiment, aqueous streams containing oxygenated hydrocarbon impurities are contacted with particulate solids, either inert or catalytic solids, for deposition of the oxygenated hydrocarbons and subsequently subjecting the solids and deposited oxygenated hydrocarbons to oxidation and combustion in a fluidized bed operation to convert the oxygenated hydrocarbons to carbon oxides and water which can be readily discharged to the atmosphere.

---

Figure 1:
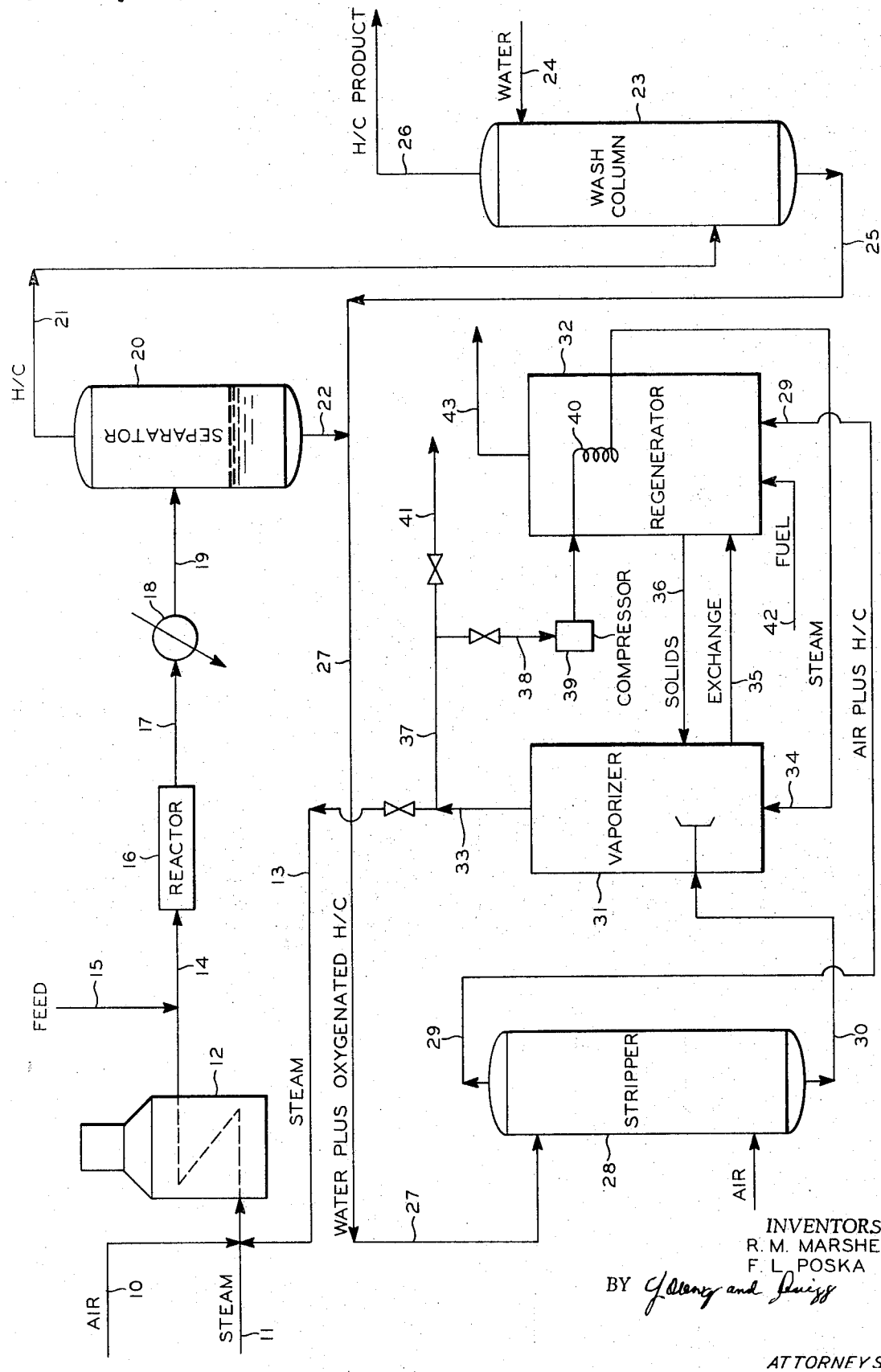

This invention relates to the purification of liquid streams containing undesirable impurities. In accordance with another aspect, this invention relates to the purification of aqueous streams containing impurities by deposition of the impurities onto particulate solids to oxidize and burn off the deposits from the particulate solids, and thereby converting the impurities to innocuous materials. In accordance with a further aspect, this invention relates to the purification of water streams obtained from oxidative dehydrogenation processes containing oxygenated hydrocarbon impurities by depositing the oxygenated hydrocarbon impurities on particulate solids and then oxidizing and burning off the deposits in a fluidized bed combustion zone. In accordance with a further aspect, this invention relates to the deposition of oxygenated hydrocarbon impurities present in aqueous streams onto particulate solids, either inert or catalytic solids, by contact with fixed bed or fluidized bed particulate solids followed by oxidation and burning off of the deposits from the particulate solids in a fluidized combustion zone.

In the dehydrogenation of butene to convert same to butadiene a conventional catalyst employed comprises iron oxide, chromium oxide and an alkali metal carbonate such as potassium carbonate. Operation with this catalyst in the presence of relatively large concentrations of steam promotes the water-gas reaction and maintains the catalyst substantially free of carbonaceous deposits as long as there is an effective concentration of the carbonate present in the catalyst. This oxidation reaction also produces small concentrations of oxygenated hydrocarbons which may leave the process in the hydrocarbon effluent and/or in the separated steam condensate.

In a more recently developed butene dehydrogenation process known as oxidative dehydrogenation, an oxygen-containing gas is fed to the catalytic reaction zone containing a catalyst such as stannic phosphate along with the butenes feed and steam, and a substantial portion of the hydrogen produced by dehydrogenation is combusted to water vapor. This not only removes the inhibiting effect of the hydrogen on further dehydrogenation, but also supplies heat to this endothermic reaction resulting in high conversions and per-pass yields of butadiene at relatively good selectivity. By this method, additional steam is produced which is recovered from the process effluent as condensate. Also, moderate concentrations of oxygenated hydrocarbons are generated which similarly appear in the condensed steam and/or in the hydrocarbon effluent.

The present invention is directed to the separation of oxygenated hydrocarbons from reaction effluents containing same and converting the oxygenated hydrocarbons into innocuous materials which can be readily discharged to the atmosphere in a nonpolluting manner.

Accordingly, an object of this invention is to provide a process for the elimination of oxygenated hydrocarbons from reaction effluents.

Another object of this invention is to purify aqueous streams containing oxygenated hydrocarbons.

Another object of this invention is to remove impurities from liquid streams containing same and converting the impurities to innocuous materials which can be discharged to the atmosphere.

Another object of this invention is to provide an improved process for the oxidative dehydrogenation of hydrocarbon.

A still further object of this invention is to remove oxygen-containing materials from aqueous streams as produced by oxidative dehydrogenation.

Other objects and aspects as well as the several advantages of the invention will be apparent to those skilled in the art upon reading the specification, the drawings, and the appended claims.

In accordance with the invention, aqueous streams containing oxygenated hydrocarbon impurities are purified of the impurities by contacting aqueous streams containing these impurities with heated particulate solids under conditions sufficient to vaporize at least a portion of the water into steam and cause the oxygenated hydrocarbons to deposit onto the heated particulate solids and then subjecting the particulate solids having deposited thereon the oxygenated hydrocarbon impurities to combustion conditions to convert the deposits into carbon oxides and water which can be discharged to the atmosphere in a nonpolluting manner.

In accordance with one embodiment of the invention, an aqueous stream containing oxygenated hydrocarbons obtained from an oxidative dehydrogenation process effluent is contacted with a fluidized bed of particulate solids under conditions to vaporize water and deposit the impurities onto the solids followed by subjecting the solids containing deposited impurities to combustion to convert the deposits into carbon oxides and water.

In a preferred embodiment of the invention, the combustion zone is operated under fluidized bed conditions to vaporize water and convert the deposits into innocuous materials.

Further, as illustrated in the drawings, it is within the scope of the invention to carry out the oxidative dehydrogenation process yielding the aqueous stream containing oxygenated hydrocarbon impurities either in a fixed bed or fluidized bed contacting technique.

The particulate solids employed according to the invention for contacting with aqueous streams containing oxygenated hydrocarbon impurities can be inert or catalytic materials. Thus, in accordance with one embodiment, an inert type of particulate solid is employed in a cyclic process for contacting with contaminated aqueous streams and regeneration of the inert material for reuse in the process. In another embodiment of the invention, particulate solids comprising an oxidative dehydrogenation catalyst can be employed for contacting with the waste water stream containing oxygenated hydrocarbon impurities for deposition of the impurities and at least partially vaporizing water to convert same into steam which can be reused in the process.

Figure 2:
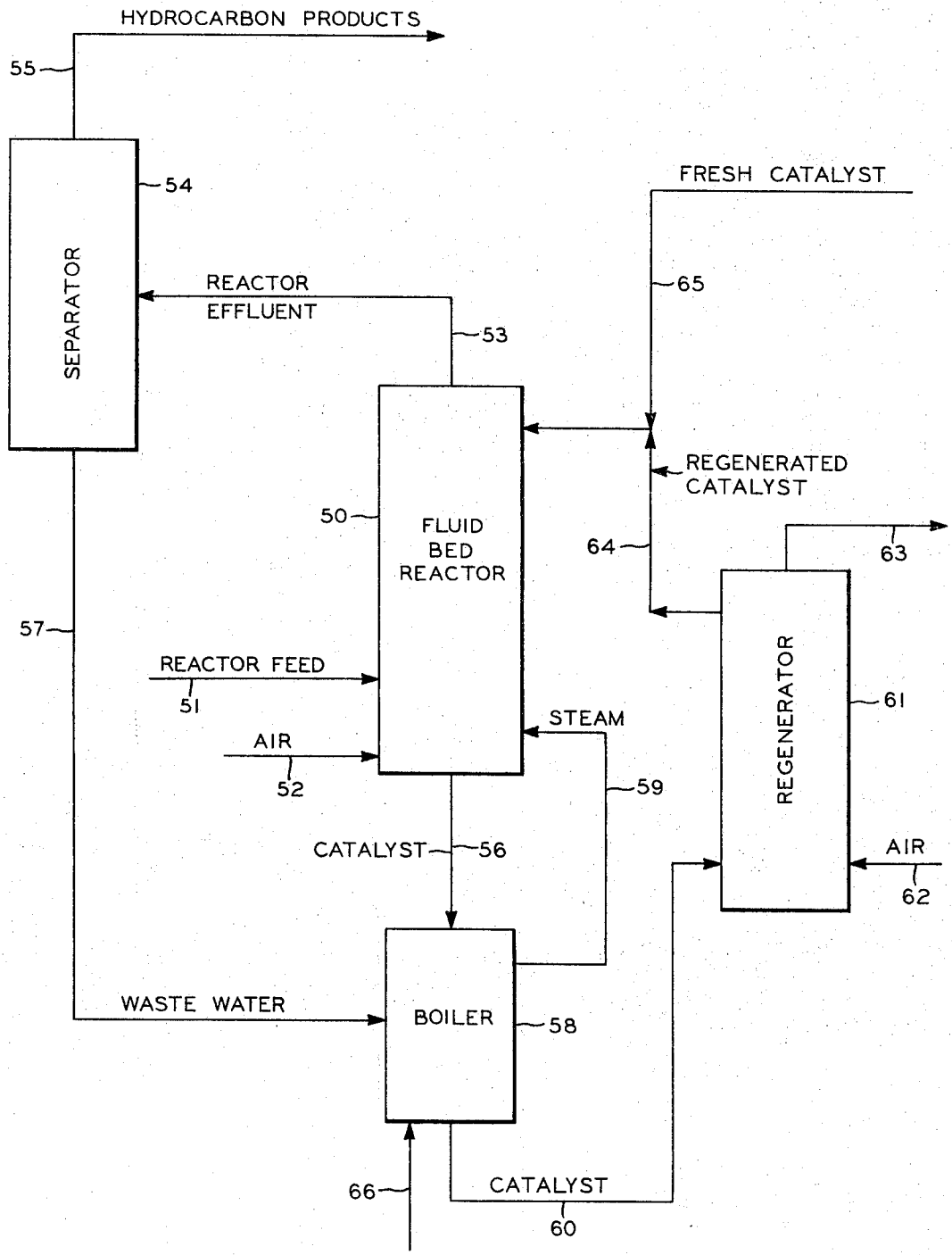

A better understanding of the invention will be obtained upon reference to the accompanying illustrative drawings, in which:

FIG. 1 is a schematic flow diagram embodying a fixed bed oxidative reaction zone followed by recovery of water containing oxygenated hydrocarbons from the effluent which water stream is subjected to stripping, vaporization and combustion of deposited impurities; and FIG. 2 is another embodiment of the invention wherein a fluidized bed oxidative dehydrogenation zone is employed in combination with a boiler for contacting of catalyst solids and waste water in a moving bed zone, followed by combustion of the deposited oxygenated hydrocarbon impurities.

With reference to FIG. 1, an oxygen-containing gas such as air and makeup steam are introduced into furnace 12 by way of lines 10 and 11, respectively. Recycle steam (source to be described in more detail hereinbelow) can be introduced by line 13 into makeup steam line 11 and passed to furnace 12. The air and steam mixture is heated to furnace 12 to the desired dehydrogenation temperature and then passed by way of line 14 to reactor 16 together with hydrocarbon feed introduced by way of line 15.

Reactor 16 (illustrated as a fixed bed reactor) preferably contains a catalyst such as a tin phosphate catalyst disclosed in U.S. 3,320,329. The dehydrogenation temperature in reactor 16 is ordinarily about 1000° F. The various reaction conditions, including ratios of steam to air to hydrocarbon as well as space velocities, are set forth in said patent. The oxygen in the feed is substantially totally consumed by combination with abstracted hydrogen and oxidation of a small portion of the hydrocarbon feed, e.g., butene. Conversion of butene to oxygenated products, primarily organic acids, such as acetic, and aldehydes, such as acetaldehyde, is about four percent. The dehydrogenation reaction can be carried out in a fixed bed, moving bed, or fluidized bed reactor operating batchwise or on a continuous basis.

The dehydrogenation reaction effluent comprising dehydrogenated hydrocarbon, unconverted hydrocarbon, oxygenated hydrocarbons, and steam is removed by way of line 17 and passed through cooling zone 18 and then by way of line 19 to phase separator 20. The reactor effluent is cooled in zone 18 to a temperature of about 180° F. to condense substantially all of the water present in the effluent. This condensate, which contains a substantial concentration of oxygenated hydrocarbons, is separated from the gaseous, hydrocarbon phase in separator 20 wherein the gaseous phase is removed overhead by way of line 21 and the water phase containing oxygenated hydrocarbons, generally within a concentration range of 0.1 to 0.3 weight percent calculated as carbon, is removed as bottoms by way of line 22.

In the embodiment illustrated by FIG. 1, the gaseous phase which includes dehydrogenated product, e.g., butadiene, and unconverted hydrocarbon, e.g., butene, is passed by way of line 21 to a wash column 23, such as disclosed in U.S. 3,536,775, wherein it is contacted countercurrently with water introduced by way of line 24. Wash column 23 is generally operated at a temperature in the range 80–180° F. and a pressure of 5–50 p.s.i.g. The water passing countercurrently to the hydrocarbon-containing gases washes therefrom soluble organic materials and is removed as bottoms by way of line 25. A gaseous, hydrocarbon product-containing stream substantially freed of impurities is removed overhead by line 26 for further processing. The bottoms stream comprising water and soluble organic materials generally within a concentration range of 0.4 to 1.2 weight percent calculated as carbon is combined with the water phase removed as bottoms from separator 20 in line 22, and passed by way of line 27 to stripper 28.

Water plus oxygenated hydrocarbons and water soluble organics are introduced into stripper 28 by way of line 27 and pass downwardly countercurrent to an oxygen-containing gas, such as air, which strips the more volatile materials present from the water phase, removing them together with the air as a gaseous overhead stream by way of line 29 which is passed to regenerator 32. The water phase, reduced in volatile organic materials but containing relatively nonvolatile oxygenated hydrocarbons, is removed as bottoms from stripper 28 by way of line 30 and passed to vaporizer 31. Stripper 28 is operated at a temperature in the range of 150 to 250° F. and at a pressure in the range of 5 to 100 p.s.i.g., depending upon the pressure at which vaporizer 31 is operated.

The stripped water phase containing oxygenated hydrocarbons removed from the base of stripper 28 by way of line 30 is introduced into vaporizer 31 which contains a fluidized bed of heated particulate solids such as alumina. The water phase in vaporizer 31 is contacted with fluidized solids at an elevated temperature sufficient to vaporize the water, and the generated vapors are removed overhead as steam by way of line 33. A substantial portion of the oxygenated hydrocarbons present in the water phase introduced into vaporizer 31 by way of line 30 are deposited by reason of their nonvolatility and/or polymer-varnish formation onto the fluidized particulate solids. Superheated steam introduced by way of line 34 into vaporizer 31 is used as a source of fluidizing medium. The pressure at which vaporizer 31 is operated is dependent upon other process considerations, in particular the uses to which the generated steam will be put, but will generally be in the range of 5 to 100 p.s.i.g., therefore, the fluidized bed and steam temperatures will generally be correspondingly in a range of 250 to 400° F. Utilizing a fluidized solids technique to vaporize the water in vaporizer 31, oxygenated hydrocarbon deposits build up on the particulate solids, and settled solids containing substantial amounts of deposits are continually withdrawn from vaporizer 31 by way of line 35 and passed to regenerator 32 wherein the deposits are oxidized and burned off from the particulate solids, and the thus-regenerated and heated solids are returned to vaporizer 31 from regenerator 32 by way of line 36.

Steam is separated from fluidized solids in vaporizer 31 and taken overhead by way of line 33 and a portion is recycled to furnace 12 by way of valved line 13. The remainder of the steam flow in line 33 is passed by way of line 37 and valved line 38 to compressor 39 and then through heat exchange coil 40, within regenerator 32, and thence through line 34 into the lower portion of vaporizer 31 as a source of fluidizing medium, or injected into hot solids transfer line 36 as the transport gas therefor. The remainder of the steam in line 33 not recycled or used for fluidizing can be passed through valved line 41 for use elsewhere as desired. Depending upon the steam pressures required for the several uses, compressor 39 can be advantageously located in conduit 37 or 33, or eliminated if steam is otherwise supplied.

The particulate solids having deposited thereon oxygenated hydrocarbons passed to regenerator 32 by way of line 35 are subjected to an elevated temperature in the presence of an oxygen-containing gas sufficient to oxidize and burn off the deposits and form carbon oxides and water. Air plus combustible volatile materials including oxygenated hydrocarbons and traces of hydrocarbon feed and product components are introduced into regenerator 32 by way of line 29 as the oxidizing medium and a portion of the fuel for combustion. All or a portion of stream 29 can be injected into cooled-solids transfer line 35 as the transport gas therefor as desired. Additional fuel such as natural gas can be introduced into regenerator 32 by way of line 42. The temperature maintained within regenerator 32 will ordinarily be in the range 800–1000° F. in the presence of sufficient oxygen, preferably in the form of air, to oxidize and burn off the deposits from the particulate solids thus reheating them. The pressure in the regenerator 32 is maintained at or near the vaporizer pressure 31 as is conventional in fluidized processing technique and while the vaporizer and regenerator are shown in side-by-side relationship for simplicity, the vaporizer-over-regenerator configuration is preferred whereby regenerated, hot solids are gas-lifted up into the vaporizer from which deposit-coated, cooled solids descend into the regenerator by gravity.

Solid particles usable as the fluidized solids of this invention comprise alumina, quartz, sand, and other particles, ground and screened to about 30 to 60 mesh, having similar characteristics of freedom from softening, agglomerating, shattering, spalling, etc. at the above-described conditions of operation. The products of combustion comprising carbon oxides and water are removed overhead from regenerator 32 by way of line 43.

Since both the volatile and nonvolatile oxygenated hydrocarbons in the steam condensate and the wash column water are oxidized to carbon oxides and water in regenerator 32, the inventory of stream-contaminating water is disposed of in a nonpolluting manner, useful heat is gained from their efficient combustion, and steam generated by this waste disposal process is readily usable in the dehydrogenation process and elsewhere.

Referring now to FIG. 2, hydrocarbon feed to be dehydrogenated and air are introduced into fluidized bed oxidative dehydrogenation reaction zone 50 by way of lines 51 and 52, respectively. Dehydrogenation effluent is removed by way of line 53 and passed to separation zone 54. Hydrocarbon products comprising dehydrogenated hydrocarbon, for example, butadiene, and unconverted hydrocarbon, for example, butene, and other materials are removed overhead from separation zone 54 by way of line 55 and passed to further processing as desired. Catalyst solids are removed from the base of fluidized bed reactor 50 by way of line 56.

A water stream containing oxygenated hydrocarbon impurities is removed from separation zone 54 by way of line 57 and passed to boiler 58 where the water stream containing oxygenated hydrocarbon impurities is contacted with hot catalyst introduced into boiler zone 58 by way of line 56. The water phase introduced into boiler zone 58 by way of line 57 is contacted with a moving bed of catalyst solids at an elevated temperature sufficient to vaporize the water and the generated vapors are removed overhead as steam by way of line 59 and returned to fluidized bed reactor 50. A substantial portion of the oxygenated hydrocarbons present in the water phase introduced into zone 58 by way of line 57 are deposited by reason of their nonvolatility and/or polymer-varnish formation onto the particulate catalyst solids. Fluidizing steam may be added by conduit 66.

The particulate solids having deposited thereon oxygenated hydrocarbons are removed from the base of zone 58 by way of line 60 and passed to regeneration zone 61. An oxygen-containing gas such as air is introduced into a lower portion of regeneration zone 61 by way of line 62. The catalyst particulate solids having deposited thereon the oxygenated hydrocarbon impurities are subjected to an elevated temperature in the presence of an oxygen-containing gas sufficient to oxidize and burn off the deposits and form carbon oxides and water in regeneration zone 61. The conditions of temperature, pressure and other process variables in zone 61 will be substantially the same as defined above in connection with FIG. 1 with respect to zone 32. The products of combustion comprising carbon oxides and water are removed overhead from zone 61 by way of line 63 for further use as desired. Regenerated catalyst is removed from zone 61 by way of line 64 and returned to reaction zone 50. If desired, fresh catalyst can be introduced into the regenerated catalyst line 64 by way of line 65.

EXAMPLE I

A series of runs were conducted utilizing a fluidized bed system similar to vaporizer 31 and regenerator 32 of FIG. 1. Alumina in the form of Norton alundum beads ground and screened to a 30–60 mesh size distribution were used as the particulate solids. A series of runs were made with this material to determine the effect of bed temperature, nitrogen versus air as the fluidizing gas, and the water feed rate. Bed temperatures of 250 and 300° F., and water feed rates of 460, 720, and 980 ml./hr. were used. The fluidizing gas rate was 7 s.c.f.h. One liter of the alumina particles was charged to the vaporizer.

The results for this study are presented in Table I. The most significant variable was the water feed rate. As the water feed rate increased the organic content of the effluent condensate decreased. This may be due to a greater percentage recovery of water at the higher feed rates. From this it could be postulated that if all of the water were recovered the condensate would have a lower concentration of organics than was observed. At the lower temperature no difference was found between using air and nitrogen. At the higher temperature there may have been a better removal of organics using air. This effect is somewhat obscured due to the reduction in inventory of alumina in the vaporizer. From the catalyst sampling during these studies only 500 cc. of alumina remained at the end. Runs 13, 14 and 15 were made with water that had been air purged. The air purging showed an effect on the organic content of the condensate but this was attributed to two factors. The alumina content was only half of that charged at the beginning of the study and had not been regenerated for several runs.

During these studies four carbon burnoffs at 800 to 900° F. were made on the alumina particles. Carbon contents before burnoff were 0.25, 0.089, 0.070, and 0.060 weight percent, and after burnoff were 0.01, 0.002, 0.002, and 0.006 weight percent, respectively. This shows that alumina can be regenerated and would make a satisfactory material.

TABLE I.—RESULTS FOR ALUMINA STUDIES

| Run No. | Fluid | Fluidizing gas rate (s.c.f.h.) | Bed temp. (F.) | Water feed rate (ml./hr.) | Carbon content, p.p.m. Feed | Carbon content, p.p.m. Effluent cond. |
|---|---|---|---|---|---|---|
| 1 | N₂ | 7 | 250 | 460 | 610 | 370 |
| 2 | N₂ | 7 | 250 | 720 | 610 | 340 |
| 3 | N₂ | 7 | 250 | 980 | 610 | 220 |
| 4 | Air | 7 | 250 | 460 | 1,100 | 360 |
| 5 | do | 7 | 250 | 720 | 1,100 | 350 |
| 6 | do | 7 | 250 | 980 | 610 | 240 |
| 10 | N₂ | 7 | 300 | 460 | 1,100 | 550 |
| 11 | N₂ | 7 | 300 | 720 | 1,100 | 610 |
| 12 | N₂ | 7 | 300 | 980 | 1,100 | 430 |
| 7 | Air | 7 | 300 | 460 | 1,100 | 480 |
| 8 | do | 7 | 300 | 720 | 1,100 | 370 |
| 9 | do | 7 | 300 | 980 | 1,200 | 360 |
| 13* | N₂ | 7 | 250 | 460 | 880 | 670 |
| 14* | N₂ | 7 | 250 | 720 | 880 | 470 |
| 15* | N₂ | 7 | 250 | 980 | 880 | 370 |

*Water was purged with air prior to being charged to feed tank.

NOTES:
1. Alumina was regenerated prior to runs 1, 4, 7, and 10.
2. Each run above was for about 5 hours duration.

We claim:
1. A process for the oxidative dehydrogenation of hydrocarbons and the conversion of oxygenated hydrocarbon by-products formed during the dehydrogenation to innocuous materials which can be safely discharged to the atmosphere which comprises:
 (a) contacting a dehydrogenatable feed comprising reactant paraffinic and olefinic hydrocarbons with an oxygen-containing gas, steam, and catalyst under dehydrogenation conditions to produce a reaction effluent comprising steam, dehydrogenated reactant hydrocarbon, unconverted reactant hydrocarbon and oxygenated hydrocarbons comprising aldehydes, ketones and carboxylic acids formed from said reactant hydrocarbons during said contacting. and cooling said reaction effluent sufficiently to condense said oxygenated hydrocarbons along with said steam.

(b) separating dehydrogenated reactant hydrocarbon and unconverted reactant hydrocarbon from said effluent, leaving a water phase containing condensed steam and said oxygenated hydrocarbons.

(c) contacting said condensed steam and oxygenated hydrocarbons with a bed of heated particulate solids under conditions such that a substantial portion of said condensed steam is vaporized and is removed overhead and a substantial portion of said oxygenated hydrocarbons is deposited on said heated particulate solids, (d) removing said heated particulate solids having said oxygenated hydrocarbons deposited thereon from said bed and passing same to a combustion zone, and (e) subjecting said particulate solids having oxygenated hydrocarbons deposited thereon removed in step (d) to an elevated temperature in the presence of an oxygen-containing gas sufficient to combust said deposits and burn same from said solids by oxidation and converting said deposits to carbon oxdies and water, thereby heating said solids substantially freed of deposits to an elevated temperature sufficient to vaporize water upon being returned to said contacting in step (c).

2. A process according to claim 1 wherein said condensed steam and oxygenated hydrocarbons obtained in step (b) are subjected to stripping prior to said vaporizing by contacting with an oxygen-containing gas under conditions sufficient to remove volatile organic compounds therefrom and form an overhead comprising said oxygen-containing gas and volatile organic compounds, and further wherein said overhead is passed to step (e) as at least a portion of the combustion medium and fuel for combusting said deposits.

3. A process according to claim 1 wherein at least a portion of said vaporized condensed steam removed overhead in step (c) is recycled to the reaction zone during dehydrogenation.

4. A process according to claim 1 wherein said contacting in step (c) is effected with a fluidized bed of heated particulate inert solids and further wherein the oxidation in step (e) is carried out by fluidizing said particulate solids with a gas.

5. A process according to claim 1 wherein the heated particulate solids employed in step (c) were solids obtained from the catalytic dehydrogenation zone and the contacting is effected in a moving bed of catalyst solids and further wherein combustion of the oxygenated hydrocarbons deposited onto the catalyst solids is effected in a fluidized bed combustion zone.

6. A process according to claim 1 further comprising the steps of:

(f) stripping said condensed steam and oxygenated hydrocarbons prior to contacting with air to remove overhead from said stripping a stream comprising air and volatile organics and passing said stream to said combustion zone in step (e) as at least a portion of the combustion medium and fuel for combusting said oxygenated hydrocarbons deposited on said solids, (g) washing said hydrocarbon portion obtained in step (b) to remove water soluble materials therefrom and recover, as product, a substantially pure hydrocarbon portion, and recycling water and soluble materials removed by said washing to said stripping in step (f), (h) recycling at least a portion of said vaporized condensed steam removed overhead in step (c) to the dehydrogenating reaction zone, and (i) heating at least another portion of said vaporized condensed steam removed overhead in step (c) and introducing same into said contacting in step (c) as the fluidizing medium for said particulate solids.

7. A process according to claim 2 wherein said hydrocarbon portion in step (b) is washed with water to remove water soluble materials therefrom and form a bottoms stream comprising condensed steam and said water soluble materials and leaving as an overhead a purified hydrocarbon portion as product, and further wherein said bottoms stream is passed to said stripping along with said condensed steam and oxygenated hydrocarbons obtained in step (b).

8. A process according to claim 3 wherein another portion of said vaporized condensed steam removed overhead in step (c) is superheated by indirect heat exchange in said combustion zone and the superheated steam thus formed is passed to said contacting in step (c) as at least a portion of the fluidizing medium therein to fluidize said particulate solids and aid in the vaporization and removal of said condensed steam.

9. In a hydrocarbon conversion process wherein there is separated from the effluent of said conversion a water phase containing oxygenated hydrocarbon by-products formed during the conversion comprising aldehydes, ketones and carboxylic acids, the steps of converting the water to steam and the oxygenated hydrocarbon by-products to innocuous materials which can be safely discharged to the atmosphere comprising:

(a) contacting said water phase containing said oxygenated hydrocarbons with a bed of heated particulate solids under conditions of temperature and pressure sufficient to substantially vaporize said water into steam and deposit said oxygenated hydrocarbons on said heated particulate solids, (b) removing said heated particulate solids having said oxygenated hydrocarbons deposited thereon from said bed and passing same to a combustion zone, and (c) subjecting said particulate solids having deposited thereon said oxygenated hydrocarbons removed in step (b) to an elevated temperature in the presence of an oxygen-containing gas sufficient to combust said deposits and burn same from said solids by oxidation and convert said deposits into carbon oxides and water, which can be discharged to the atmosphere in a nonpolluting manner, and heat said solids substantially freed of deposits to an elevated temperature sufficient to vaporize water upon being returned to said contacting in step (a).

10. A process according to claim 9 wherein said water phase is subjected to stripping prior to said contacting in step (a) with an oxygen-containing gas under conditions sufficient to remove volatile organic compounds therefrom and form an overhead comprising said oxygen-containing gas and volatile organic compounds, and further wherein said overhead is passed to step (c) as at least a portion of the combustion medium and fuel for combusting said deposit.

11. A process according to claim 9 wherein said contacting in step (a) is effected with a fluidized bed of heated particulate inert solids and further wherein the oxidation in step (c) is carried out by fluidizing said particulate solids with a gas.

12. A process according to claim 9 wherein said contacting in step (a) is effected with a fluidized bed of heated particulate inert solids and wherein at least a portion of the steam produced during said contacting is superheated by indirect heat exchange by heat generated during combustion of said solids in step (c) and said superheated steam is used as a source of fluidizing medium for said contacting in step (a).

References Cited

UNITED STATES PATENTS

| | | | |
|---|---|---|---|
| 3,402,753 | 9/1968 | Thomas | 203—100 |
| 3,442,769 | 5/1969 | Heinz | 203—100 |
| 3,679,764 | 7/1972 | Hinton et al. | 203—96 |
| 3,646,239 | 2/1972 | Hutson et al. | 260—681.5 R |
| 3,536,775 | 10/1970 | Hutson et al. | 260—681.5 R |
| 2,917,451 | 12/1959 | Leffer | 208—81 |
| 3,557,238 | 1/1971 | Cunningham | 260—680 E |
| 3,288,878 | 11/1966 | Hachmuth | 260—683.3 |

WILBUR L. BASCOMB, JR., Primary Examiner

U.S. Cl. X.R.

260—681.5 R; 203—49, 100